United States Patent [19]

Tschierse

[11] 3,869,663

[45] Mar. 4, 1975

[54] METHOD AND APPARATUS FOR CHECKING METALLIC OBJECTS BY MONITORING ITS EFFECT ON ONE CYCLE OF AN ALTERNATING FIELD

[75] Inventor: Klaus Tschierse, Berlin, Germany

[73] Assignee: Berliner Maschinenban-Actien-Gesellschaft, Berlin, Germany

[22] Filed: June 12, 1972

[21] Appl. No.: 261,630

[30] Foreign Application Priority Data

June 11, 1971 Germany .......................... 2130057

[52] U.S. Cl. .............. 324/41, 194/100 A, 324/34 R

[51] Int. Cl. .............................................. G01r 33/12

[58] Field of Search ...................... 324/34 R, 41, 40; 194/100 R, 100 A, 101

[56] References Cited

UNITED STATES PATENTS

| | | | |
|---|---|---|---|
| 3,373,856 | 3/1968 | Kusters et al. | 194/100 R |
| 3,436,649 | 4/1969 | Takechi et al. | 324/41 |
| 3,682,286 | 8/1972 | Prumm | 194/100 A |

*Primary Examiner*—Robert J. Corcoran
*Attorney, Agent, or Firm*—Craig & Antonelli

[57] ABSTRACT

A method and apparatus of checking metallic objects to determine whether they conform to a desired standard by passing the object between the primary and secondary coils of a transformer so that the amplitude of the A.C. voltage output from the secondary is varied. Then the half-wave amplitude of this output is compared with the amplitude of a reference A.C. voltage, which is also used to energize the primary coil, to determine whether the half-wave amplitude of the output lies within a predetermined range correlated to the desired standard. To make allowance for the fact that the output is above the lower limit for longer than it will be above the upper limit if this latter is exceeded, the comparison is by first and second comparators relating to the lower and upper limit respectively, the first comparator giving an output pulse when the upper limit is exceeded. The output pulse for the first comparator is divided into two paths one to a negator giving an output pulse assigned the binary value 1 to an input of a NAND-gate, the other path leading to a first flip-flop which when triggered by the output pulse from the first comparator gives an output pulse also assigned binary value 1 to another input of the NAND-gate. The output from the second comparator is fed to a second flip-flop which if triggered by a pulse for the second comparator gives an output pulse of binary value 0 to a third input of the NAND-gate, otherwise the absence of a pulse from the second flip-flop has a binary value 1. Only when all the three inputs to the NAND-gate are each of value 1 will output for the gate change for binary value 1 to 0 to indicate that the object satisfies the desired standard. The flip-flops are reset automatically, to permit evaluation of each output pulse from the comparator.

14 Claims, 10 Drawing Figures

METHOD AND APPARATUS FOR CHECKING METALLIC OBJECTS BY MONITORING ITS EFFECT ON ONE CYCLE OF AN ALTERNATING FIELD

This invention relates to a method for checking metallic objects, such as coins or the like in which the object travels through a periodically alternating field and the change in the field caused by the presence of the object at a measuring point is supplied by a detector to an evaluation circuit.

The checking of metallic objects for a plurality of qualities can be essential during the manufacture of the latter as quality control, however, it is absolutely necessary whenever the object, such as a coin, represents a value, for which goods which can be preselected are to be discharged or any other service is to be provided by a vending machine.

Known, purely mechanical, coin checking devices attempt to ascertain the value of the coin by, for example, checking the weight. In addition, the dimensions of the slot for the coins are so chosen that they correspond to the diameter and thickness of a definite coin size. Coin checking devices constructed in this simple manner and operating purely mechanically have the disadvantage that they can only deal with one value or size of coin. Mechanical coin checking devices in which coins of different values can be inserted, are complicated in their construction and accordingly are expensive and are prone to breakdowns.

The great variety of coins used in different countries, their ease of access due to freely convertible currencies and modern mass tourism even in remote countries, and repeated attempts to counterfeit coins, makes a refined and accurate checking of the latter, such as is possible with purely mechanical coin checking devices, absolutely necessary. Coins of various currencies exist, e.g., with different face values yet with almost identical dimensions and weight.

Coin checking devices have been developed, which evaluate capacitively or inductively the electromagnetic properties of metallic objects within specified ranges of tolerance.

In the case of checking coins by means of a capacitive measuring arrangement dielectric plates are located on both sides in a vertical passage, which plates externally support electrodes, the coin forming a third electrode being passed through the capacitor thus formed. In this connection, a capacitance measuring circuit has become known, in which the dielectric is formed by only one plate on the underside of an inclined passage conveying the coin horizontally, a moving contact member being provided on the upper side, which on the one hand electrically connects the coin to the measuring circuit, and on the other hand presses it against the plate, as disclosed in German Offenlegungschrift No. 1,449,298.

A device constructed as a compensating circuit for distinguishing between various coins is also known, which makes use of the inductive measuring method, in which a pair of coils is produced by the common winding of two separate leads, the first coil of which is supplied with A.C. voltage, which produces a magnetic alternating field and induces a voltage with the other coil, as disclosed in German Offenlegungschrift No. 1,478,895.

A further checking device operating according to the inductive measuring principle is able to receive and check several types of different coins passing through a common coin channel, the latter passing in front of a corresponding number of detectors. The detectors are located in a lateral wall of the coin channel and staggered with respect to each other in such a way that each detector only responds to coins of a certain type having a specific diameter and to coins, which have a diameter greater than this specific diameter. In the known coin payment device the detectors are connected by the output terminals of their oscillatory circuits to the input terminals of a logic circuit, which by means of appropriate gate stages allows a selection of the individual coin values, as disclosed in accepted German application Pat. No. 1,449,277 as laid open to public inspection.

An electronic coin checking method is also known, which is characterized in that the coin inserted is guided through a coupling loop through which an adjustable test frequency flows, the coin being excited to electromagnetic oscillations, due to which in the case of resonance when the test frequency coincides with the electromagnetic resonant frequency or a harmonic of the coin to be accepted by feeding back, a clear signal is produced in the coupling loop, which serves for distinguishing the coin or eliminating the coin, as disclosed in accepted German application Pat. No. 1,474,740 as laid open to public inspection.

A further device evaluating the self-induction of a coil which can be affected by eddy current losses of the coin inserted, makes use of an electronic evaluation system, which is such that only coins, whose effect on the oscillator lies between two predetermined limits, receive a "good-identification."

As in the other known coin checking devices the oscillations of the oscillatory circuits are rectified and the D.C. voltage or rectified alternating voltage resulting from a plurality of individual oscillations is supplied to an evaluation circuit. The logic circuit associated with the known coin checking device only gives a coin acceptance pulse when, within a predetermined period of time, which is at least equal to the period of time which a body falling through the coin track requires for passing through all parts of self-inductance coils present, and smaller than the period of time between coins inserted successively, only one of the rectifiers associated with the oscillators delivers a pulse. Known electronic components such as delay elements, flip-flop circuits, differentiating circuits, inverters and the like are used in the logic circuit which is used, as disclosed in German Offenlegungschrift No. 1,902,806.

Finally, a method for detecting or determining the dimensions and material of coins and workpieces is also known, which makes use of capacitive and/or inductive probes, the voltage time integral or the current time integral of the voltage or current pulses occurring as coins or workpieces pass the probes is formed from the electrical output signal of the probes, as disclosed in German Offenlegungschrift No. 1,925,042.

One disadvantage of all known electrical or electronic checking methods and devices for metallic objects, such as coins or the like is that a comparatively long period of time is necessary for the identification of the individual coins, which period of time is approximately the same length as that which is necessary for the movement of a coin past a detector. These measuring times which are long by electronic standards result, when using self-oscillating oscillatory circuits, due to the build-up and decay times of the oscillators, whereas in the case of evaluation the starting and decay times of the rectifier stand out detrimentally above the rectification of the measuring current. In addition, in known measuring devices of the aforesaid type there is the disadvantage that the measuring frequency cannot be kept sufficiently stable for longer periods of time, and there is no willingness to provide extensive and therefore expensive remedies for this. The comparatively large range of tolerance, necessitated by the considerable natural variations in the dimensions of one and the same type of coin, is increased still further in the above-described known devices and methods since changes in the variations of amplitude, and above all the various speeds of travel of the coins through the measuring field, appear in the test result.

An object of the invention is to provide a method for checking metallic objects, such as coins or the like, which method, making use of an appropriate measuring frequency, is able, within one period of this measuring frequency, to measure and evaluate rapidly and reliably the electromagnetic properties of the object to be checked, independent of incidental changes in the measuring frequency and of its variations of amplitude, and independently of the speed of travel of the object.

According to the invention there is provided a method for checking metallic objects, such as coins or the like, in which the object is moved through a periodically alternating field and the change in the field at a measuring point caused by the presence of the object is supplied by a detector to an evaluation circuit, characterized in that by means of functionally connected logical circuit elements, the evaluation circuit compares the positive or negative amplitude of one or every individual period of the alternating field, within a period of time spread over its peak value with at least one reference value defining a range of tolerance such that then and only then does a "good-indication" of the subject occur, if the amplitude lies within the range of tolerance.

In a preferred embodiment of the method according to the invention, one starts with the inductive measuring method, in which the object to be checked is moved through the coupling field between two coils and due to the eddy current losses occurring, the A.C. voltage induced in the secondary coil is effected according to the properties of the metallic object. The individually induced voltage amplitudes of the A.C. voltage are compared with two different reference voltages and evaluated by means of a digital electronic switching system, the frequency of the reference voltage being identical to that of the coupling field if an A.C. voltage is used for the reference voltage. In this case it is particularly advantageous that the reference voltage is taken from the A.C. voltage generator, to which the primary winding is also connected. It is of course also possible to use a corresponding D.C. voltage or rectified A.C. voltage as reference voltage.

In the aforesaid preferred embodiment the reference voltages indicating the upper and lower limit of the range of tolerance as well as the measuring voltage produced in the secondary coil were supplied to an identification emitter, the "good-identification" due to the occurrence of pulses at the output side occurring at only one of the outputs of the latter. The pulse interrogation of the two outputs of the identification emitter takes place by means of two bistable flip-flop units facilitating buffering, connected in turn at their outputs by a NAND-gate.

In a modified embodiment, the logical connection of the two outputs of the identification emitter takes place by means of a NAND-gate, whose output pulses at the time of the peak value of the measuring frequency are compared with a trigger pulse by means of a bistable flip-flop unit. The trigger pulses supplied to the bistable flip-flop unit are obtained in this case by differentiation and detection of the zero crossing of the measuring frequency.

As a result of the method according to the invention for checking metallic objects, it is possible, to undertake their identification within one individual period of the measuring frequency used, the evaluation of one oscillating half-wave, during the presence of the coin or the like at the measuring point being fully adequate. The method is independent of the change in measuring frequency or variations in amplitude, and of other variations within the supply of voltage. The time of travel and the speed of the metallic object to be checked through the periodically alternating field is of no significance for the evaluation of the test result. A rectification or summing of the A.C. voltage of the measuring field does not take place. The evaluation and checking of the measurement can be repeated after each period of the measuring frequency.

Further features and advantages of the invention will now be described with reference to the accompanying drawings, which illustrate embodiments of apparatus for carrying out the invention.

In the method according to the invention, it is basically assumed that the object to be checked is moved through a periodically alternating force field and the field change caused by the presence of the object is picked up by a detector, is supplied to an evaluation circuit, which compares a single, or, if desired, each period of the alternating field individually within a time interval spread symmetrically relative to a half-wave of the periodic field oscillation, with two reference values. In this case depending on the circuit arrangement, the time interval can be selected to be so short that it practically coincides with the maximum oscillation. Depending on the field of application and the optimum choice of means, the periodically alternating field can be a pneumatic or hydraulic periodically alternating pressure field, an alternating field consisting of heat, light, X-ray, gamma or any other energy radiation, or finally even the electromagnetic alternating field of a capacitance, inductance, or even a self-inductance. Also purely mechanical spring oscillations, lever displacements or the like, can be used for checking metallic or other objects within the framework of the present method.

The method for checking coins by means of an electromagnetic coupling field between two coils connected to each other inductively through which current flows is described hereafter.

Figure 1:
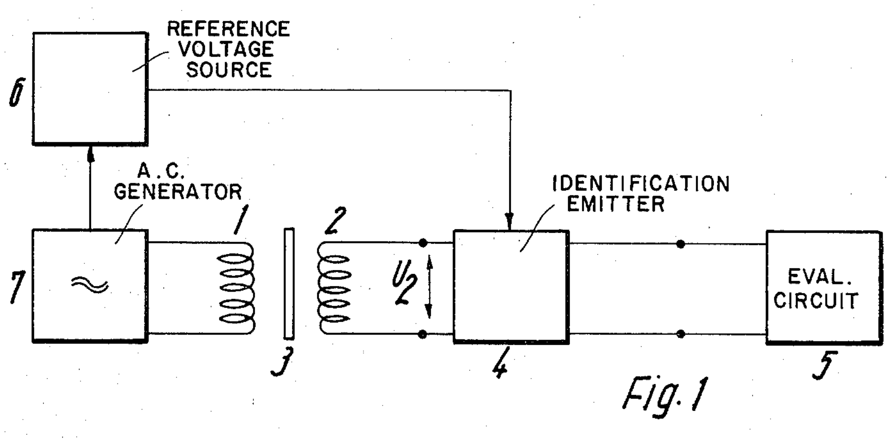
FIG. 1 is a diagrammatic circuit diagram of a preferred embodiment of a circuit arrangement for carrying out the method according to the invention.

According to FIG. 1 the metallic object 3 is moved through the inductive coupling field of the two coils 1, 2, and the change in the induced alternating voltage $U_2$ caused by the eddy current losses is evaluated. The alternating current from the generator 7 flows through the primary coil 1 at the given measuring frequency. The voltage $U_2$ induced in the secondary coil 2, is supplied to an identification emitter 4, which is connected at its output to an evaluation circuit 5. The identification emitter 4 compares the amplitude of the induced voltage with two reference values, these reference values being taken from the source 6 of alternating voltage. The frequency of the reference voltage is identical to that of the measuring frequency of the generator 7. In order to make the measuring arrangement independent of frequency variations, the reference voltage is taken from the generator 7.

Figure 2:
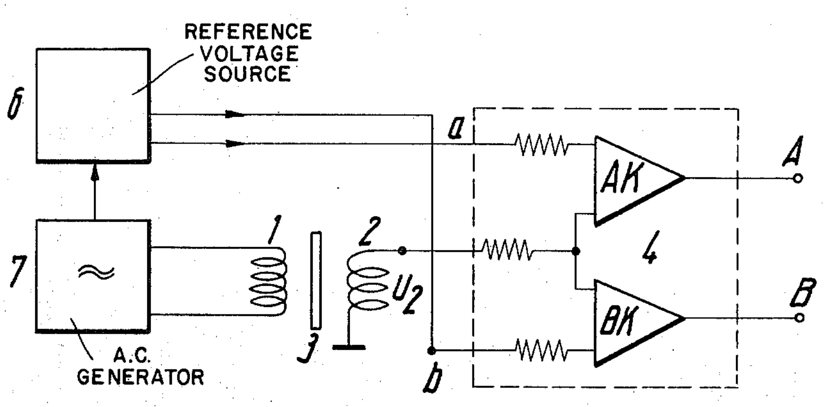
FIG. 2 is a partial circuit diagram of the arrangement in FIG. 1 showing in more detail repetition of the identification emitter.

The identification emitter 4 illustrated diagrammatically in FIG. 2 consists of two comparators AK, BK, one input of which is fed with the reference voltage *a*, or with the reference voltage *b*, whereas the two other inputs, metallically connected, are connected to the secondary coil 2.

Figure 5:
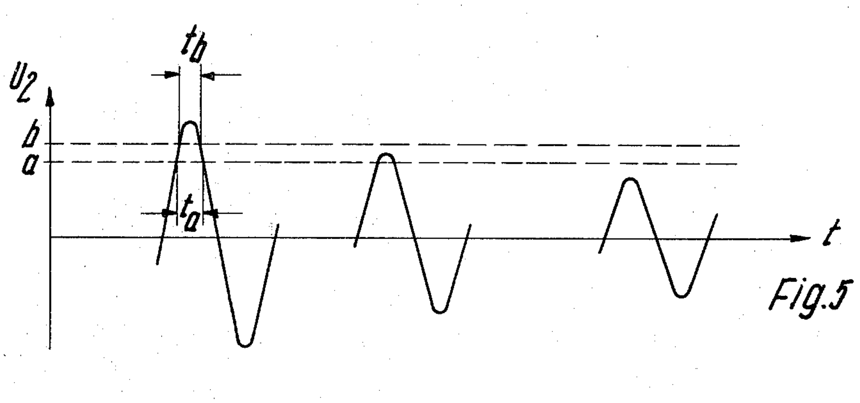
FIG. 5 is a diagrammatic representation of the principle of the method according to the invention.

As can be seen from FIG. 5, by means of the two reference voltages *a* and *b*, a range of tolerance is defined, the "good-identification" of a metallic object to be checked being characterized in that during the presence of the latter at the measuring point the voltage induced in the secondary coil 2 has an amplitude which lies between the value *a*, *b*. The comparator AK compares each individual amplitude of the induced voltage $U_2$ with that of the reference voltage *a*, whereas the comparator BK compares the induced voltage $U_2$ with the reference voltage *b*. When the induced voltage $U_2$ is both greater than the reference voltage *a*, as well as the reference voltage *b*, output signals with the prescribed measuring frequency occur at the output terminals AB of both comparators. On the other hand, if the induced voltage $U_2$ is smaller than both of the reference voltages, *a*, *b*, then no pulses appear at the outputs A, B. Only when the induced voltage $U_2$, i.e., the voltage peak value of a half-period oscillation lies between the two reference voltages *a*, *b*, do pulses appear at the output of one of the comparators, whereas the second comparator is blocked. Since in the last mentioned case the induced voltage $U_2$ is greater than the reference voltage *a*, but smaller than the reference voltage *b*, output signals only appear at the terminal A. In addition, the identification emitter 4 can consist of two comparators or zero amplifiers or even of any other known threshold value emitters, such as gate circuits and the like. Here it is generally a case of networks which depending on a control voltage either allow an input signal to pass or block it.

The evaluation circuit connected after the identification emitter 4 is so constructed that a "good-identification" of the metallic object moved through the coupling field only occurs when the amplitude of the induced voltage $U_2$ lies within the range of tolerance defined by the reference voltage *a* and *b*. The range of tolerance between the reference voltages *a*, *b* is selected so that if no coin or corresponding metallic object to be checked is located in the coupling field between the two coils 1 and 2, or even if an object 3 is present in this coupling field, whose eddy current losses are smaller than those of the above-mentioned objects, the induced voltage $U_2$ exceeds both the reference voltage *a* as well as the reference voltage *b*. A "good-identification" is also not given if a metallic object 3 is present in the coupling field, whose eddy current losses are so great that the voltage amplitude of the induced voltage remains below the smallest reference voltage *a*.

A simple OR circuit cannot be used as evaluation circuit 5 for the identification of the object 3 to be checked within one or within each period of the measuring frequency, since the excess of the tolerance limits defined by the two reference voltages *a* and *b*, by one and the same half-wave within one period of the induced alternating voltage does not take place simultaneously but rather with some shift in time (see FIG. 5). When both reference voltages *a* and *b* are exceeded by the induced voltage, the time during which the lower tolerance limit is exceeded is $t_a$, whereas for the upper tolerance limit it is $t_b$, and therefore it is shorter.

Figure 3:
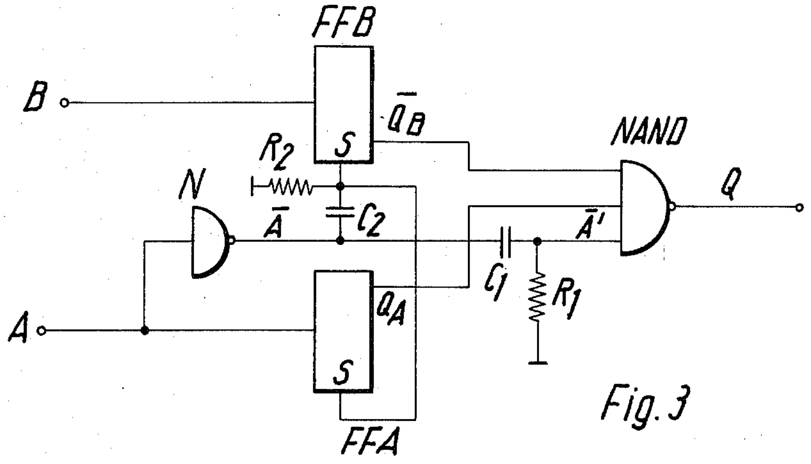
FIG. 3 is a possible embodiment for an evaluation circuit used in the method according to the invention.

As a result of this state of affairs, which allows pulse sequences of identical frequency, pulses of different lengh appear at the output terminals A and B of the identification emitter 4. The subsequently connected evaluation circuit 5 must be arranged such that it is in a position to take these facts into consideration due to a short buffering. A possible advantageous embodiment of an evaluation circuit 5 is illustrated in FIG. 3.

Figure 8:
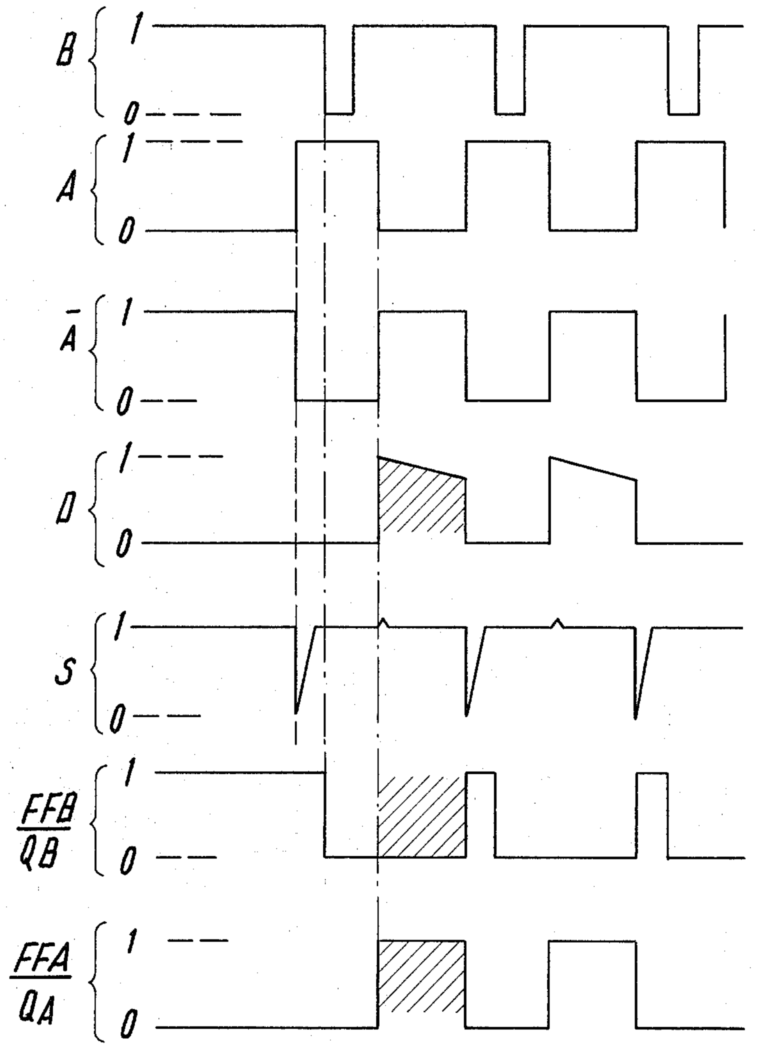
FIG. 8 is a pulse time diagram of the individual logic circuit elements of FIG. 3.

The logic connection illustrated is based on the known Sheffer function, so-called NAND-gates, which occurs due to a negation after a conjunction circuit. The pulse interrogation of the output terminals A and B, of the two comparators AK and BK takes place by means of two binary flip-flop units, and in fact by means of a flip-flop FFA for the output A and a flip-flop FFB for the output B of the identification emitter 4. When the amplitude of the induced voltage at the secondary coil 2 exceeds both the reference voltage *a*, as well as the reference voltage *b*, the pulse sequences pertaining to the reference letters A and B in FIG. 8 are present at the output terminals A and B of the identification emitter 4. The length of the square wave pulses corresponds in this case to the excess time $t_a$, and $t_b$, (according to FIG. 5) of the amplitude of the induced voltage $U_2$. The two flip-flops FFA and FFB are connected to each other, as shown, at their outputs by means of the said NAND-gates. One output $Q_A$ of the flip-flop FFA is connected to one input of the NAND-gate, whereas the output $\overline{Q}_B$ (negated with respect to the said output of the flip-flop FFA) of the flip-flop FFB, is connected to a second input of the NAND-gate. The sequence of pulses present at the output terminal A of the identification emitter 4 is sent to the flip-flop FFA and also to the third input of the NAND-gate by way of a negation element N and an integrator stage $C_1$, $R_1$. The sequence of pulses at the output of the negation element N thus corresponds to the square wave pulse characteristic designated by the reference letter $\bar{A}$ in FIG. 8, whereas at the said third input of the NAND-gate, these pulses have the characteristic designated by the reference letter D in FIG. 8. By means of the resistor $R_1$ the associated input of the NAND-gate is kept at 0, when no pulses are present at the terminal A, so that in this case the NAND-gate is permanently blocked.

Since it is desired that the evaluation of the induced measuring voltage should be possible separately and selectively within each period of the measuring frequency, then for each individual period it is necessary to reset the two flip-flops FFA and FFB before each evaluation, which as illustrated by the reference S in the time diagram, takes place with the negative edge of the pulse present at the terminal A. The integrator element $R_2$ $C_2$ is provided for this, which, in the manner illustrated in FIG. 3, is connected to the setting inputs of each of the flip-flops FFA and FFB. The setting pulses are kept as short as possible by appropriate choice of the resistance values for the resistor $R_2$.

The pulse characteristic at the outputs $\overline{Q}_B$ of the flip-flop FFB and at $Q_A$ of the flip-flop FFA is illustrated in the last two pulse time diagrams of FIG. 8.

According to the above-mentioned details, a "good-identification," i.e., the discharge of a pulse within one period of the measuring frequency at the output of the NAND-gate, can only occur if the amplitude value of the induced voltage lies within the tolerance limits between the reference voltages *a* and *b*. If pulses are present both at the terminal A as well as at the terminal B as a result of these two reference values being exceeded, then the binary output values at the time of the interrogation are characterized at the output $\overline{Q}_B$ by 0 and at the output $Q_A$ by a 1, whereas the information value at the third input of the NAND-gate which is not associated with the two said outputs of flip-flops FFA, FFB, as negated and differentiated pulse $\bar{A}^1$, of the pulse present at the terminal A is also 1. Since the NAND-gate is characterized by a conjunction connection after negation, its output Q does not change, and remains at 1. A "bad-identification" thus results.

As can be readily ascertained, for the case where only the value of the lower reference voltage *a*, but not the reference voltage *b*, is exceeded by the amplitude of the induced voltage $U_2$, the binary switching conditions at all three inputs of the NAND-gate are characterized by the value 1. The information on the output side at the NAND-gate simultaneously tilts over from the binary condition 1 to the condition 0.

This behavior at the output Q of the NAND-gate corresponds to a "good-identification." If finally pulses are not present either at the terminal A or at the terminal B of the identification emitter 4, then the information at the time of the interrogation is 1 or 0 at the output $\overline{Q}_B$, is equal to 0 or 1 at the output $Q_A$, and at the input of the NAND-gate connected to $C_1$ $R_1$ is equal to 0, due to which a "bad-identification" again results.

Figure 4:
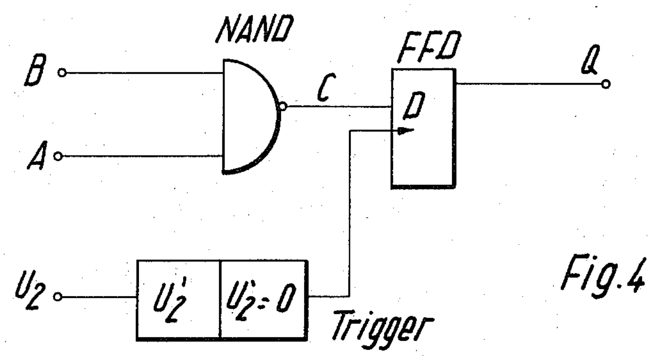
FIG. 4 is a further embodiment of a logic circuit arrangement as verification of evaluation.
Figure 9:
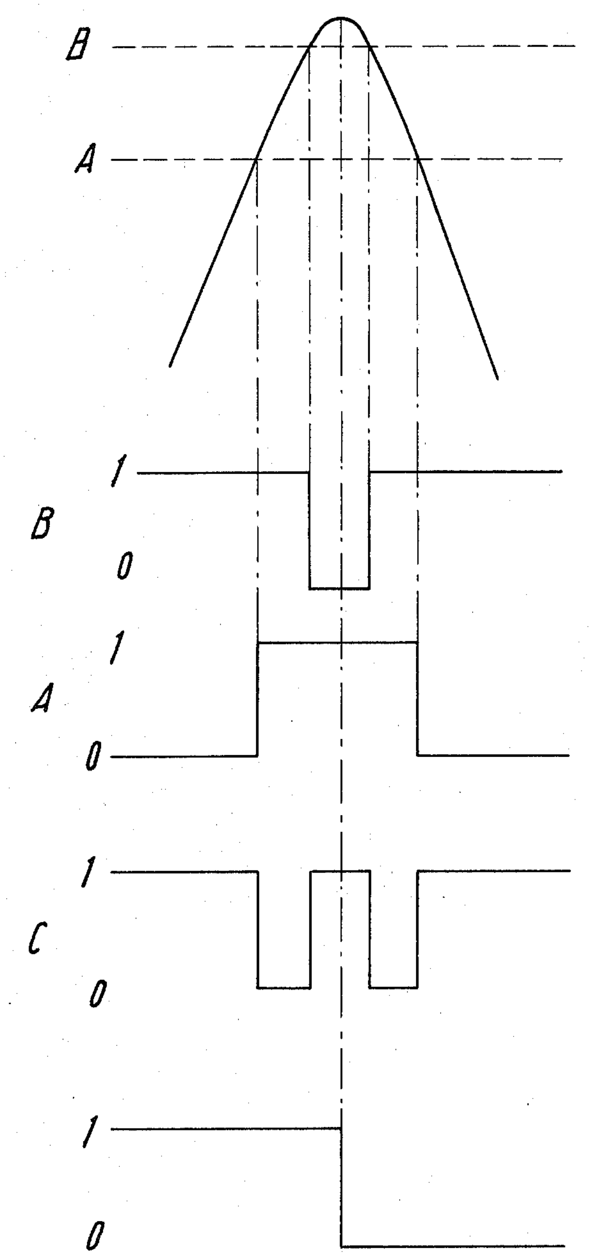
FIG. 9 is a pulse time diagram corresponding to FIG. 8 for the embodiment in FIG. 4.

In the embodiment of an evaluation circuit illustrated in FIG. 4, the two terminals A, B of the identification emitter 4 are directly connected to the inputs of a NAND-gate, which is connected on the output side to one input of a flip-flop FFD. Trigger pulses are supplied to the second input of the flip-flop FFD. These are obtained by differentiation of the induced alternating voltage $U_2$. From the zero-axis crossings of the differentiated alternating voltage, trigger pulses are derived. With this arrangement the interrogation of the pulses emitted by the output C of the NAND-gate takes place at the time of the negative edge of the trigger pulse, since only at this time can the logical connection of the information values at the terminals A and B or at the two inputs of the NAND-gates be meaningfully evaluated. The information value at the output C of the NAND-gate passes, as the pulse diagram in FIG. 9 shows, from 1 to 0, as soon as an induced voltage pulse exceeds the value of the lower reference voltage *a*, whereas the switching condition of the NAND-gate tilts back to the output value 1 in case this voltage pulse also exceeds the upper reference voltage *b*. The pulse characteristics illustrated in FIG. 9 at the reference C thus results for the case where the amplitude of the induced voltage $U_2$, within one period of the measuring frequency, has the characteristics illustrated in the upper line of FIG. 9. As mentioned above, the interrogation in the evaluation circuit according to FIG. 4 takes place at the time of the negative edge of the trigger pulse and thus exactly at the time when the illustrated half-wave of the voltage $U_2$ induced in secondary coil 2 has its maximum value. The information obtained at the output of the flip-flop FFD remains stored until the next interrogation by the negative edge of the subsequent trigger pulse. A change in information occurs at the terminal Q whenever the amplitude value of the induced voltage lies within the prescribed tolerance limit between the reference voltages *a*, *b* or if the amplitude still at least reaches the reference voltage *a*.

This circuit arrangement is also independent of frequency, since the trigger pulse obtained from the induced alternating voltage $U_2$ is always synchronous with the measuring frequency, because it is derived therefrom. The embodiment of a preferred evaluation circuit illustrated in FIG. 4 is particularly suitable for the evaluation of a multiplicity of different metallic objects or the face values of different coins, since an associated identification emitter with corresponding reference voltages and an associated NAND-gate is necessary for each coin size, on the other hand, however, only one trigger is required for the entire arrangement.

Figure 6:
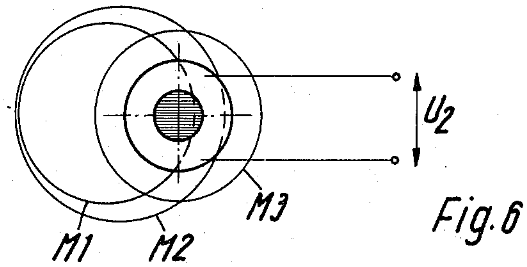
FIG. 6 is a sketch of a detector in its position for coins of varying diameter.

FIG. 6 shows that with the method according to the invention even different types of coin with varying electromagnetic properties can be tested by means of several position detectors. A selection of the individual coin values is thus possible due to the different insertion depths of the coins in the detectors or measuring range. The different insertion depths are determined by the so-called position detectors. In this case it is assumed that with the different metallic objects to be checked or coins with varying electromagnetic properties the voltage induced is kept constant. FIG. 6 shows three coins $M_1$, $M_2$, $M_3$ of varying diameter in the region of the secondary coil, from which the induced voltage $U_2$ is taken.

Figure 7:
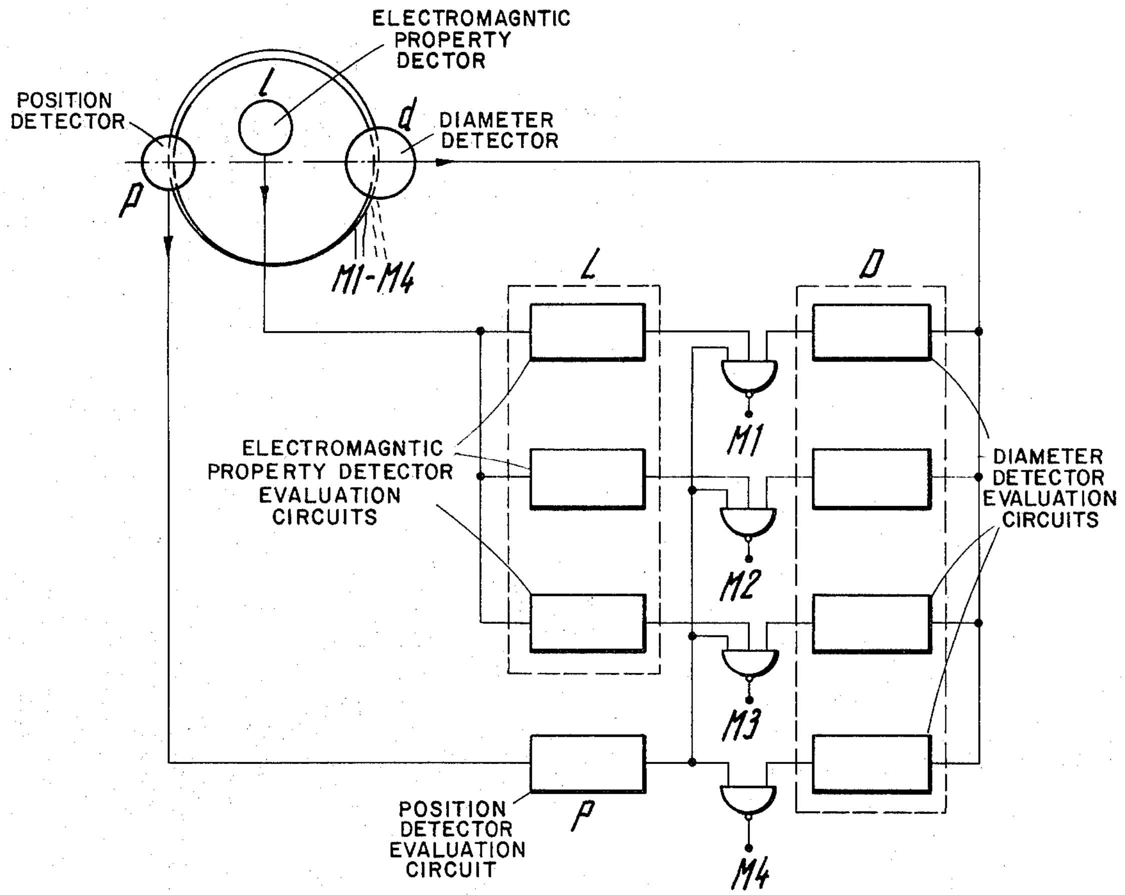
FIG. 7 is an evaluation circuit for the simultaneous recognition of several parameters of the metallic objects to be checked.

Finally, FIG. 7 shows a combined arrangement of position detector and associated evaluation circuits, by means of which, e.g., the diameter of varying coins M1 to M4 and their varying electromagnetic properties can be determined. The position of the coin is determined by the evaluation by means of the position detector *p*, whereas the different diameters can be determined in the coupling fields of the detectors *d*, by the different insertion depths. The evaluation by the detector 1 determines the electromagnetic properties of the material from which the coin is made and thus, for example, the composition of the alloy. As soon as a coin has reached the position given by the position detector $p$ by means of the two other detectors 1, the evaluation of the diameter and material from which the coin is made takes place, in which case only when all the statements coincide, is the corresponding coin output ($M_1$–$M_4$) set to zero.

In the previously described embodiments two reference voltages were used, in which the "good-identification" was characterized in that the peak value of the measuring voltage lay between the two different reference amplitudes.

Figure 10:
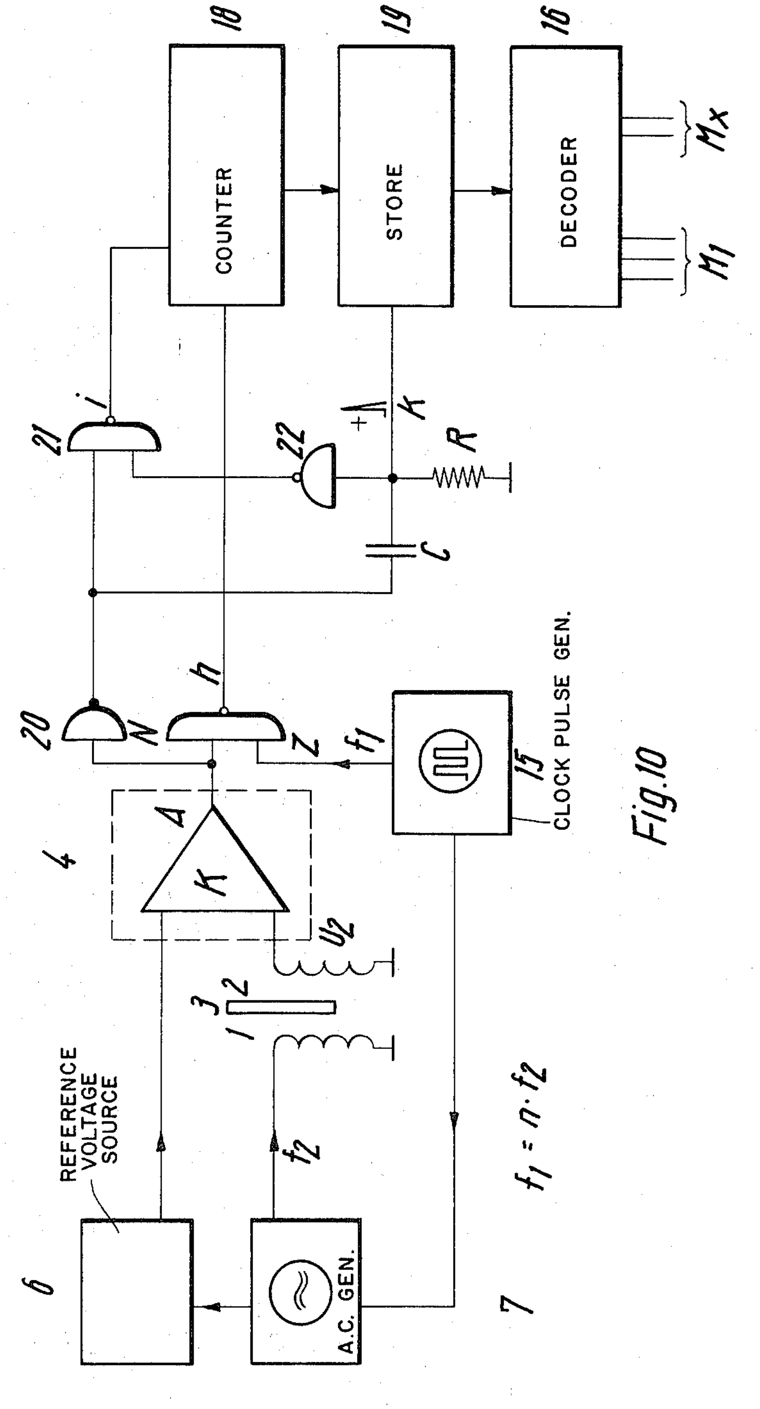
FIG. 10 is an additional possible embodiment.

FIG. 10 shows a further possible embodiment of the method according to the invention for checking metallic objects in a diagrammatic circuit diagram. The measuring generator 7 is controlled by a clock pulse generator 15, the frequency $f_1$ of the clock pulse generator 15 being greater than the output frequency $f_2$ of the measuring generator.

The amplitude of the measuring voltage in the primary winding 1 is changed by the metallic object 3 in the secondary coil 2 which provides an output to a first input of a comparator K. The comparator K also receives at its second input a reference threshold voltage from the reference voltage source 6. The comparator K has an output A coupled to one input of a NAND-gate, the NAND-gate having the pulses of the clock pulse generator 15 applied at its second input. The pulses from the pulse generator 15 are at a frequency $f_1$ which is generally $f_2$, the measuring frequency being $f_2$. When the amplitude of the voltage $U_2$ induced in the coil 2 is the same or greater than the reference threshold voltage from the reference voltage source 6, the comparator K supplies an output signal to the NAND-gate for as long as this condition exists and pulses such as square wave pulses at the frequency of the pulses from the clock pulse generator are emitted at the output of the NAND-gate and are supplied to the counting input of a counter 18 in which the number of received pulses are connected and supplied to a storage device 19. The output of the comparator K is also supplied to a negation or inverter element 20 which in response to the output signal of the comparator K provides an inverted output signal to a differentiator stage CR and one input of a NAND-gate 21. The stage CR provides an output to the storage device or store 19 and to a negation or inverter element 22 having its output connected to the second input of the NAND-gate 21 which provides an output for resetting the counter 18.

In operation, the measuring frequency generator 7 provides a measuring frequency signal having an alternating wave form in accordance with the clock pulse generator output and when a metallic object 3 induces an amplitude change in the positive or negative half cycle or period of the wave form which exceeds the reference threshold voltage, the comparator K provides an output and pulses are supplied by the NAND-gate to the counter 18 for counting therein. When the amplitude of the positive or negative half cycle falls below the reference threshold voltage, no output is provided by the comparator K and by means of the negation elements 20, 21, the stage CR and the NAND-gate 21, the counter is reset such that a count is obtained for each positive or negative portion of each cycle or period of the measuring wave form in which the reference threshold voltage is exceeded. The count obtained for the period is stored in the store 19 and supplied to a decoder 16 which decoder may have a plurality of outputs $M_1$ to $M_x$ corresponding to the number of coins to be checked and which outputs are associated with the various values of coin and have different time intervals. Thus, in the case of a "good-identification", the time interval which is determined by the number of pulses counted by counter 18 during the period in which the reference threshold voltage was exceeded lies within a predetermined tolerance time for a particular coin which predetermined tolerance time is stored in the decoder 16. Thus, if the count of the counter 18 corresponds to the known tolerance time for a predetermined coin, a "good-identification" is effected.

I claim:

1. A system for checking metallic objects, such as coins or the like comprising means for generating a periodically alternating field through which the object is moved, detector means for measuring the change in the field at a measuring point caused by the presence of the object and providing an output signal having an alternating waveform, and evaluation circuit means connected to said detector means for comparing the positive or negative amplitude of the alternating signal within one period of the signal spread over its peak value, with a defined range of tolerance formed by two different reference voltages such that a "good-indication" of the object occurs, only if the amplitude lies between the two reference voltages, and resetting means for resetting said evaluation circuit means for each period of the signal evaluated.

2. A system according to claim 1, wherein said means for generating the alternating field includes a plurality of inductively connected coils generating the field through which said object is moved, said detector means providing the output signal in the form of a measuring voltage having voltage amplitudes, said evaluation circuit means including logic circuit means for comparing the voltage amplitudes of the measuring voltage with the two different reference voltages and a digital electronic switching means for evaluating the result of said comparison, the frequency of the reference voltages being identical to that of the field.

3. A system according to claim 2 in which the reference voltages are generated by a measuring frequency generator to which a primary coil of said plurality of coils is also connected.

4. A system according to claim 3 wherein said evaluation circuit means includes first and second comparators each having a corresponding input connected to a secondary coil of said plurality of coils and another input to which a respective reference voltage is connected.

5. A system according to claim 4 in which the outputs of said first and second comparators are in the form of pulses and are connected to respective bistable flip-flop units and a NAND-gate connected to the outputs of said flip-flop units.

6. A system according to claim 5 wherein said resetting means reset the flip-flop units to the initial condition for each period of the measuring frequency to be evaluated, said resetting means including a common RC circuit connected to the flip-flop units for resetting the units in accordance with a predetermined edge of the pulses emitted by one of said first and second comparators, said one comparator being associated with a lower reference voltage of the two different reference voltages.

7. A system according to claim 10 wherein the outputs of the first and second comparators are connected to a Nand gate providing an output to a bistable flip-flop unit said resetting means includes trigger pulse means responsive to the zero crossing of the measuring voltage for providing a trigger pulse to the bistable flip-flop unit for comparison with the output of said NAND-gate at the time of the peak value of the measuring frequency.

8. A system according to claim 7 in which said trigger pulse means supplies to the bistable flip-flop unit, having a rectangular waveform.

9. A method for checking metallic objects, such as coins or the like, comprising moving the object through a periodically alternating field, detecting a change in the field at a measuring point caused by the presence of the object, supplying a signal having an alternating waveform representing the change in the field to an evaluation circuit, determining by the evaluation circuit whether the amplitude of one polarity of the alternating signal within one period of the signal spread over its peak value is within a defined range of tolerance formed by two different reference voltages such that a "good-indication" of the object occurs only if the the amplitude lies between the two reference voltages, and resetting the evaluation circuit for each period of the signal in which a determination is carried out.

10. A method for checking metallic objects, such as coins or the like, comprising moving the object through a periodically alternating field, detecting a change in the field at a measuring point caused by the presence of the object, supplying a signal having an alternating waveform representing the change in the field to an evaluation circuit, determining by the evaluation circuit whether the amplitude of one polarity of the alternating signal within one period of the signal spread over its peak value is within a defined range of tolerance formed by a reference voltage and a time value, such that a "good-indication" of the object occurs only if the amplitude exceeds the reference voltage and lies within the time value, and resetting the evaluating circuit for each period of the signal in which a determination is carried out.

11. A system for checking metallic objects, such as coins or the like, comprising means for generating a periodically alternating field through which the object is moved, detector means for measuring the change in the field at a measuring point caused by the presence of the object and providing an output signal having an alternating waveform, an evaluation circuit means connected to said detector means for comparing the positive or negative amplitude of the alternating signal within one period of the signal spread over its peak value, with a defined range of tolerance formed by one reference voltage and a time value supplied to said evaluation circuit means such that a "good-indication" of the object occurs only if the amplitude exceeds the reference voltage and lies within the time value, and resetting means for resetting said evaluation circuit means for each period of the signal evaluated.

12. A method according to claim 18, further including forming the alternating field by inductively connected coils and moving the object therethrough, detecting the change in the coupling field in the form of induced voltage amplitudes of a measuring voltage, comparing the amplitudes of the measuring voltage with the two different reference voltages defining the range of tolerance and evaluating the results of the comparison by means of a digital electronic switching system, the frequency of the reference voltage being identical to that of the coupling field.

13. A method according to claim 12, further including generating the reference voltages with a measuring frequency generator to which a primary coil of the alternating field coils is also connected.

14. A method according to claim 9 in which the amplitude of the alternating signal is compared with the two reference voltages defining a range of tolerance so that the "good-indication" corresponds to a peak value lying between the two difference reference voltages, and further including the steps of forming the alternating field by a coupling field of inductively connected coils and moving the object therethrough, inducing a measuring voltage having voltage amplitudes in one of the coils, comparing the voltage amplitude with the two different reference voltages and evaluating the results of the comparison by means of a digital electronic switching system, the frequency of the reference voltages being identical to that of the coupling field, and supplying the reference voltages defining the upper and lower limit of the range of tolerance and the measuring voltage produced in a secondary coil of the said inductively connected coils to an identification emitter consisting of two comparators, the "good-identification" occurring through the occurrence of pulses at the output side at only one comparator, and in particular the comparator associated with the lower reference voltage.

* * * * *